Dec. 11, 1945.   H. F. VICKERS   2,390,755
TIMING DEVICE FOR POWER TRANSMISSION SYSTEMS
Original Filed Jan. 27, 1940   2 Sheets-Sheet 1

INVENTOR.
Harry F. Vickers
BY Barnes, Kisselle, Laughlin & Raisch
Attorneys.

Dec. 11, 1945.   H. F. VICKERS   2,390,755
TIMING DEVICE FOR POWER TRANSMISSION SYSTEMS
Original Filed Jan. 27, 1940   2 Sheets-Sheet 2

INVENTOR.
Harry F. Vickers
BY
Barnes, Kisselle, Laughlin & Raisch
Attorneys.

Patented Dec. 11, 1945

2,390,755

UNITED STATES PATENT OFFICE 2,390,755

TIMING DEVICE FOR POWER TRANSMISSION SYSTEMS

Harry F. Vickers, Detroit, Mich., assignor to Vickers Incorporated, Detroit, Mich., a corporation of Michigan Original application January 27, 1940, Serial No. 315,889, now Patent No. 2,326,184, dated August 10, 1943. Divided and this application August 9, 1943, Serial No. 497,879

4 Claims. (Cl. 60—53)

This invention relates to timing devices for power transmission systems and has particularly to do with a hydraulic timing control system.

This application is a divisional of applicant's copending application, Serial No. 315,889, filed January 27, 1940, now matured into Patent No. 2,326,184, dated August 10, 1943.

The need for accurate control of power driven machinery especially in machine tool drives is well recognized. The present invention has for its object the provision of a precision timing arrangement especially adapted for hydraulic transmission equipment for machinery and machine tools and other types of control where accuracy is required. In those particular systems in which it is the practice to have a slow moving drive shaft and an output shaft which makes several revolutions to one revolution of the drive shaft, it will be seen that a small deviation in the timing device at the drive will be greatly multiplied at the output. In many cases the timing control must be connected to the drive and consequently it is essential that it be accurate.

It is a further object of the present invention to provide a timing arrangement in which the output shaft of a control system may be stopped within a few degrees of the same point in each cycle. An added feature of the device is that it may be adapted to practically any type of power system and certain objects of the invention have to do with the combination of the basic timing control with various hydraulic power systems.

Briefly, the invention consists of introducing into a hydraulic circuit two or more interconnected timing valves which are actuated from a power shaft. These valves are preferably arranged to be shifted by said shaft at different rates of movement so that at one particular point in a cycle of movement, each of the valves will have reached a definite control position which will produce a response in the system and cause a change in the operation of the driving shaft. This change may either be a stopping or a reversal or, in some cases, it might be simply a change in speed. The present invention is particularly useful in devices having long or continuous operation in which the oil heats and becomes thin. With a single counter-valve control, as the valve approaches stop position there may be leakage which will cause premature stopping or change of direction. With the provision of a "tripper" valve as well as the "counter" valve, the tripper serves as a check or seal for the counter-valve until the exact moment at which the change in action should take place.

Other objects and features of the invention relating, for example, to details of hydraulic system in which the control of the present invention may be embodied, will be brought out in detail in the following description and claims.

Figure 1:
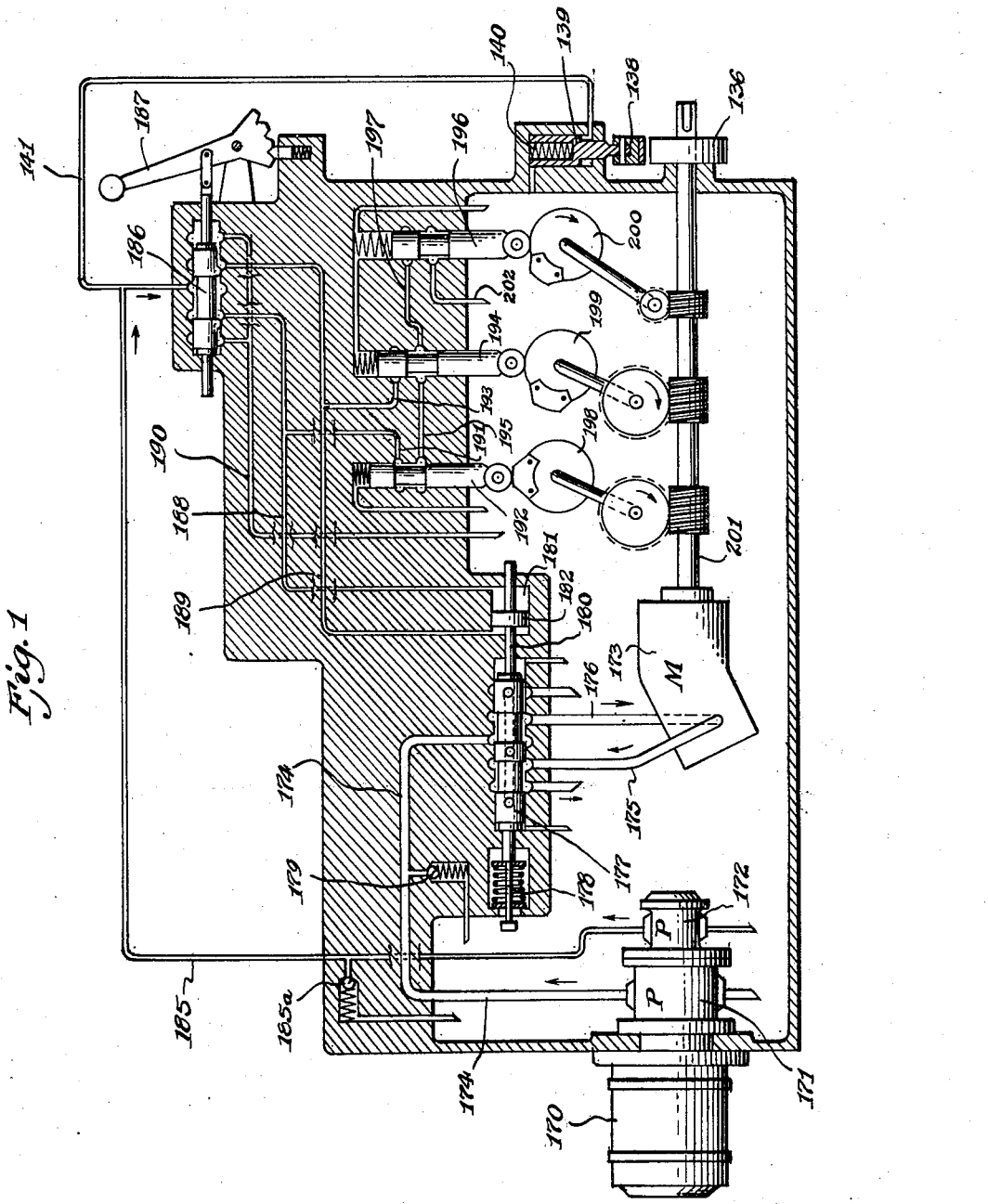
Fig. 1 illustrates a hydraulic system in which the invention is embodied to permit control for two directions of movement.

In Fig. 1, the invention is shown embodied in a hydraulic system which is reversible and in which the timing control may be used for movements in both directions. Referring to Fig. 1, a motor 170 drives a main pump 171 and a pilot pump 172. The main pump 171 is adapted to furnish pressure to a reversible motor 173 through a conduit 174 and conduits 175 and 176. A directional control valve 177 is interposed in these conduits for directing pressure from conduit 174 to either conduit 175 or 176, the other being connected simultaneously to the tank. At the left end of valve 177 is a centering device 178 adapted normally to maintain the valve in a central or neutral position. In the central position, the pump 171 is bypassed to the tank through central passageways in the valve 177. A relief valve 179 limits the pressure in the conduit 174. At the right end of the valve 177 extends a rod 180 into a chamber 181. On this rod is a piston 182.

Figure 2:
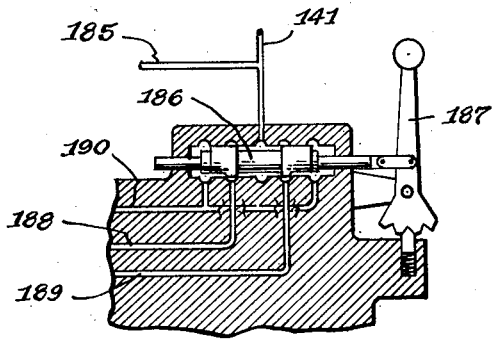
Figs. 2 and 3 are developments of Fig. 1 showing a valve in shifted positions.

The pilot pump 172 delivers pilot pressure into a conduit 185 and thence to a directional control valve 186. This valve is to be manually operated by a lever 187. Two conduits 188 and 189 connect the valve 186 with opposite sides of piston 182 in chamber 181. When the valve 186 is in the position shown in Fig. 1, pilot pressure may be directed to piston 182 through the conduit 188 to shift valve 177 to the left as shown. When valve 186 is moved to the position shown in Fig. 3, pilot pressure is then exposed to conduit 189 and the left side of piston 182 so that valve 177 will be shifted to the right and reversal of the motor will take place. Valve 186 also has a neutral position as shown in Fig. 2. In this position, both ends of piston 182 are vented to the tank through conduit 190, thus allowing valve 177 to be returned to neutral by its centering spring. In this manner, the flow from pump 171 is diverted to tank and the motor stops. It will be further noted that when valve 186 is in the position shown in Fig. 2, pressure conduit 141 is also vented to the tank. Conduit 190 connects two ports of valve 186 to the tank so that when one end of the cylinder 181 is connected to pressure, the other end will be connected to the tank. A check valve 185a is placed in line 188 to relieve the pump 172 after piston 182 is shifted and valve 186 is in a position shown either in Fig. 1 or 3.

So far there has been described in Fig. 1, a pilot operated directional control valve with a pilot valve for operating the same. Referring now to the timing control, it will be seen that leading from conduit 188 is a conduit 191 which opens to a port surrounding a valve 192. Similarly, leading from conduit 189 is a conduit 193 leading to a port surrounding a valve 194. Between the valves 192 and 194 is a conduit 195. Leading from valve 194 to a third timing control valve 196 is a conduit 197. Each of the valves 192, 194 and 196 is provided with followers which ride respectively on cams 198, 199 and 200. Cams 198 and 199 are each connected to a motor shaft 201 on motor 173 in such a way that they will make one revolution for a predetermined number of revolutions of the shaft 201. Cam 200 is connected to shaft 201 in a one to one ratio so that cam 200 revolves once for every revolution of shaft 201.

As the parts are shown in Fig. 1, the motor is completing a movement in one direction. Cam 198 has just shifted valve 192 upwardly so that conduits 191 and 195 are connected to conduit 197 which is blocked by valve 196. A slight further movement of shaft 201 in its present direction will move cam 200 so that valve 196 will be shifted to the position shown in Fig. 4.

By reason of this movement, the right side of piston 182 will be connected to the tank through conduits 188, 191, 195, 197 and a tank line 202. This venting of the right side of piston 182 will allow the centering device to move valve 177 to neutral position.

Figure 3:
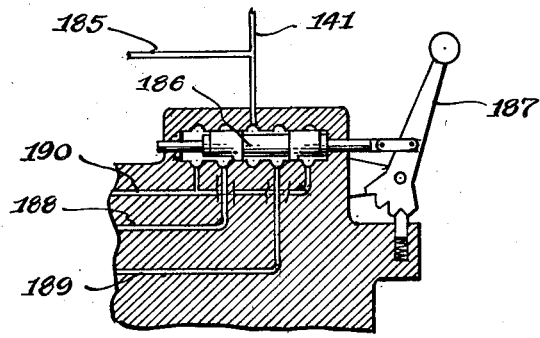
Figure 4:
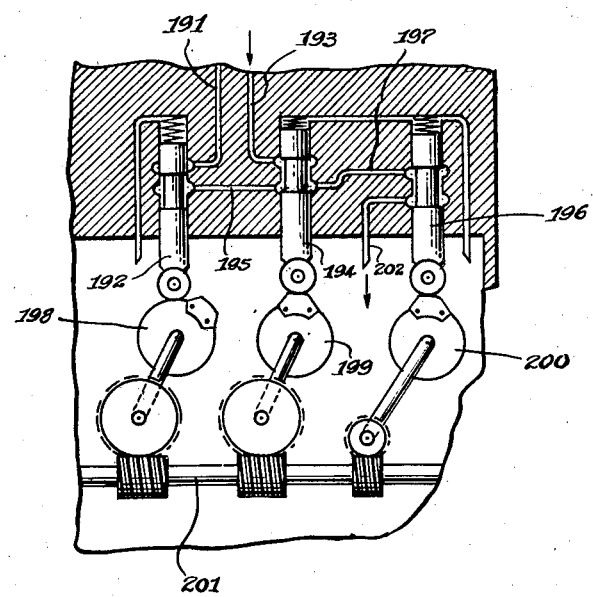
Fig. 4 is a partial view of Fig. 1 showing the relationship of the control valves during a part of the cycle.

When movement of motor 173 in the other direction is desired, the lever 187 must be moved to the position shown in Fig. 3. Pilot pressure will then be directed from conduit 185 to conduit 189 and the valve 177 will be shifted to the right. Rotation of cams 198, 199 and 200 will then be in the opposite direction to the arrows shown in Fig. 1 and at the end of the movement of the motor in this direction, the cams will be positioned as shown in Fig. 4. In this position, it will be seen that conduit 193 is connected to the tank past valve 194 and through conduit 197 and conduit 202. This will vent pressure from the left side of piston 182 and cause a return of valve 187 to neutral. A brake is provided on the shaft 201. A conduit 141 leads from the pressure conduit 188 to piston 139 which controls a brake member 138 moved by spring 140 to braking position with a drum 136 on shaft 201 when pressure in 141 is relieved.

The gear ratio of drive for cams 198 and 199 is the same but these cams are arranged out of phase with each other so that valves 192 and 194 are not opened at the same time. This permits each of the valves 192 and 194 to cooperate individually with valve 196.

I claim:

1. In a hydraulic control system a pressure source, a reversible motor to be operated by pressure from said source, a directing valve for directing pressure from said source to said motor, said valve being shiftable to control the direction of said motor, pressure responsive means for shifting said directing valve, a source of pilot pressure, means for directing said pilot pressure to said pressure responsive means to shift said directing valve to one or the other of its directing positions, and control valve means for relieving said pilot pressure to render the same ineffective comprising a plurality of bypassing valves in series, each having an open position in which said pilot pressure is bypassed through all bypass valves to a tank and means connecting said valves with said motor whereby one of said valves is shifted to and from an open position a plurality of times in the movement of said motor and others of said valves are shifted to open position at one point in the movement of said motor whereby at a predetermined point in the movement of said motor in either direction, certain of said valves will be open to relieve said pilot pressure regardless of direction of movement of said motor.

2. In a hydraulic control system, a pressure source, a reversible motor to be operated by pressure from said source, a directing valve for directing pressure from said source to said motor, said valve being shiftable to control the direction of said motor, means normally centering said directing valve in a neutral position to bypass pressure from said source, pressure responsive means for shifting said directing valve, a source of pilot pressure, means for directing said pilot pressure to said pressure responsive means to shift said directing valve to one or the other of its directing positions, and control valve means for relieving said pilot pressure to render the same ineffective comprising a plurality of bypassing valves in series, each having an open position in which said pilot pressure is bypassed to a tank and means connecting said valves with said motor whereby one of said valves is shifted to and from an open position a plurality of times in the movement of said motor and others of said valves are shifted to open position at one point in the movement of said motor whereby at a predetermined point in the movement of said motor in either direction, certain of said valves will be open to relieve said pilot pressure regardless of direction of movement of said motor.

3. In a hydraulic control system, a pressure source, a reversible motor to be operated by pressure from said source, a directing valve for directing pressure from said source to said motor, said valve being shiftable to control the direction of said motor, pressure responsive means for shifting said directing valve, a source of pilot pressure, valve means for directing said pilot pressure to said pressure responsive means, conduits leading from said valve means to said pressure responsive means, each conduit arranged to direct pressure to shift said pressure responsive means and said directing valve to respective control positions, and control valve means for relieving said pilot pressure to render the same ineffective comprising control valves connected respectively to each of said conduits, each movable respectively to open positions upon predetermined movement of said motor in opposite directions to bypass pilot pressure, and a timing control valve arranged to receive bypassed pilot pressure from either of said control valves and adapted to bypass said pilot pressure at a predetermined point in the movement of said motor.

4. In a hydraulic control system, a reversible motor, control means for controlling the starting and direction of said motor, a source of pilot pressure, pressure responsive means for operating said control means, valve means for directing said pilot pressure to said pressure responsive means, conduits leading from said valve means to said pressure responsive means, each conduit arranged to direct pressure to shift said pressure responsive means to respective control positions, and control valve means for relieving said pilot pressure to render the same ineffective comprising control valves connected respectively to each of said conduits, each movable respectively to open positions upon predetermined movement of said motor in opposite directions to bypass pilot pressure, and a timing control valve arranged to receive bypassed pilot pressure from either of said control valves and adapted to bypass said pilot pressure at a predetermined point in the movement of said motor.

HARRY F. VICKERS.